United States Patent Office 3,382,043
Patented May 7, 1968

3,382,043
PROCESS FOR PURIFYING HYDROGEN AND PREPARING CARBONYL SULFIDE
Edward A. Swakon, Hammond, Ind., assignor to Standard Oil Company, Chicago, Ill., a corporation of Indiana
No Drawing. Filed June 12, 1963, Ser. No. 287,182
5 Claims. (Cl. 23—210)

ABSTRACT OF THE DISCLOSURE

Carbon monoxide is separated from mixtures of hydrogen and carbon monoxide gases and hydrogen gas of at least 90% purity can be recovered. The separation is accomplished by reacting the gas mixture with sulfur and a secondary amine or a mixture of secondary and tertiary amines in a reaction zone under conditions generating carbonyl sulfide in situ and retaining all the carbonyl sulfide in a secondary amine or tertiary amine salt of the monothiolcarbamic acid of the secondary amine by maintaining the salt under pressure and withdrawing from the reaction zone a gas of at least 90% hydrogen content.

This invention relates to the recovery of hydrogen and more particularly pertains to a method for the recovery of hydrogen from gaseous mixtures of hydrogen and carbon monoxide.

Many processes have been proposed for the production of hydrogen. Some commercial processes for the production of hydrogen are the steam-hydrocarbon process, water gas process, producer gas process and other similar processes, which produce a mixture containing hydrogen and carbon monoxide. Such mixtures of hydrogen and carbon monoxide, after removal of sulfur compounds, are useful for example in the oxo-process for converting olefins to aldehydes and mixtures of aldehydes and alcohols. However, these mixtures of hydrogen and carbon monoxide are also useful as sources of hydrogen after removal of carbon monoxide. Commercially, the carbon monoxide is generally removed by converting it to carbon dioxide as, for example, through the reaction of carbon monoxide with water at about 700° F. This reaction:

$$CO + H_2O \rightarrow H_2 + CO_2$$

does produce additional hydrogen but also produces carbon dioxide which must be removed from the various admixtures with hydrogen.

Methods of converting carbon monoxide to carbonyl sulfide by reaction with sulfur followed by reaction of COS with primary amines and ammonia either as a separate step or at the same time as reacting CO and S to produce ureas, have been devised. There are other reactions of carbonyl sulfide which would make this compound a valuable starting material if available in commercial quantities. In our research laboratories, it has been found that secondary amines or mixtures of secondary amines and tertiary amines will react with carbonyl sulfide to form secondary or tertiary amine salts of monothiol carbamic acid derivatives of the secondary amine. It has also been discovered in our laboratories that the reaction of carbon monoxide, sulfur and secondary amine or a mixture of secondary amine and tertiary amine will also form the secondary or tertiary amine salt of the monothiol carbamic acid derivative of the secondary amine. In either case, the amine salt of the monothiol carbamic acid is stable at temperatures not exceeding about 120 to 130° C. when maintained under pressure.

It has also been found that carbonyl sulfide can be reacted at 0 to 100° C. with two moles primary amine to form the primary amine salt of the monothiolcarbamic acid of the primary amine or with one mole of primary amine and one mole of secondary or tertiary amine in which case a secondary amine salt or tertiary amine salt of the monothiolcarbamic acid of the primary amine forms. Also, carbonyl sulfide reacts with one mole of primary or one mole of secondary amine in the presence of a basic form of sodium, potassium, calcium, barium, magnesium, zinc, lead and mercury in which case the sodium, potassium, barium, magnesium, zinc, lead or mercury salt of the monothiolcarbamic acid corresponding to the primary or secondary amine forms.

Carbonyl sulfide can react with ammonia to form ammonium monothiolcarbamate in an alcohol, e.g., methanol or ethanol. However, at temperatures above 40° C. ammonium monothiolcarbamate decomposes to a mixture of urea, $H_2S$, COS and ammonia which mixture in and of itself is not very useful.

In any of the foregoing processes of forming thiolcarbamates there is great flexibility in the choice of amine reactants to form the monothiolcarbamic acid and just as great a flexibility in the choice of the amine or metal to form the salt. The amine salts of the monothiolcarbamic acids from especially secondary amines will rapidly decompose at 90 to 120° C. and atmospheric pressure to carbonyl sulfide and secondary amine. The metal salts of the monothiolcarbamic acids are useful as intermediates, or as vulcanization accelerators, the water soluble salts can be used to form vulcanizable rubber latices and the water insoluble salts, e.g. calcium, magnesium, zinc, lead and mercury salts can be used in solid vulcanizable compositions.

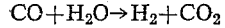

For the formation of the salt of the monothiolcarbamic acid and substantially complete utilization of COS or CO, there is employed at least two moles of the same amine or at least one mole of primary or secondary amine and one mole of tertiary amine or said basic form of metal for each mole of COS or CO. When the amine monothiolcarbamate formation and decomposition are to be used to absorb and regenerate COS, it is desirable to use the secondary amine or mixtures of secondary and tertiary amines and to use these amines in excess of the aforementioned proportions. For the purpose of absorbing and regenerating COS, the presence of excess amines is of no consequence since the amines are recovered and recycled.

In the formation of monothiolcarbamates, it has further been observed in our laboratories that the absorption of COS or consumption of CO is substantially complete and quite rapid under conditions which are readily adaptable to commercial operation. Also the regeneration or liberation of COS from the amine monothiolcarbamate is substantially complete and rapid under conditions which are readily adaptable to commercial operations. For example, when the amine monothiolcarbamate is formed by reacting CO, S and a secondary amine or mixture of secondary amine and tertiary amine at temperatures of from 50 to 150° C. and under pressure, COS is liberated rapidly and substantially quantitatively at 90 to 120° C. So if this reaction is carried out at 90 to 150° C. in the presence of sulfur and at a suitable pressure above atmospheric pressure in a closed system until the stoichiometric amount of CO is absorbed and the resulting mixture is depressurized while maintaining the mixture at 90 to 120° C., the amine monothiolcarbamate decomposes to a mixture of COS and amine or mixture of amines. This COS-amine mixture can be passed through a partial condenser to recover the amine or mixture of amines and then the COS can be separately condensed. If more than a stoichiometric proportion of CO is charged, the CO-COS mixture remaining after condensing the amine or amines, is separated by condensing COS and recycling the CO.

Utilizing the rapid reaction of CO, S and a secondary amine or a mixture of a secondary amine and tertiary amine and the rapid liberation of COS from the resulting amine monothiolcarbamate, we have devised a process for recovering hydrogen from mixtures containing hydrogen and carbon monoxide. By this process, the mixture of hydrogen and carbon monoxide is reacted with sulfur and said amines, mixtures of amines and mixtures of basic forms of metals and amines each in the proportions to carbon monoxide hereinbefore set forth. Suitably the reaction is carried out at an elevated temperature above 50° C., desirably at 50 to 150° C. so that carbonyl sulfide can be generated as a valuable by-product, and at an elevated pressure above atmospheric pressure, suitably at the autogenetic pressure sum of the partial pressures of the amine, hydrogen and CO at reaction temperatures and desirably at a pressure of from 90 to 4500 p.s.i.g. It will be appreciated that at the end of a batch reaction the pressure will be much lower than at the beginning. However, even in a batch reaction with the gas containing both hydrogen and carbon monoxide being fed continuously until the stoichiometric proportion of CO is consumed, the reaction pressure can be maintained at no greater than the sum of the partial pressures of hydrogen and other gases associated therewith and the amine.

In a continuous process, the gas containing the $H_2CO$ mixture is passed, in countercurrent relationship under pressure to a mixture of sulfur and secondary amine or sulfur with secondary amine and tertiary amine. This is conveniently accomplished by pumping the amine-sulfur mixture into the top of a reaction vessel such as a tubular reactor, packed tower such as scrubbing tower, or an extraction tower or similar to a tray or packed distillation tower or some other means for contacting a liquid and a gas, charging the gas containing $H_2$ and CO at the bottom under pressure withdrawing at the bottom under pressure a liquid effluent containing the amine-monothiolcarbamate, withdrawing at the top enriched hydrogen gases of reduced CO content and recycling these gases to remove all the CO or charging these withdrawn gases to a second reaction vessel to be contacted with an amine-sulfur mixture or an amine-basic metal-sulfur mixture. Or if economics are against such recycling or second reaction of the withdrawn hydrogen enriched gaseous mixture with these amounts of CO even up to 5 to 10 mole percent CO, this gaseous mixture can be contacted with ammonical cuprous salt solution or contacted with steam at 700° F. to convert the CO to $CO_2$ and the $CO_2$ scrubbed out with amine. However, a second reaction of the enriched hydrogen gas with additional amine-sulfur or amine-sulfur-basic form of metal will remove substantially all of the carbon monoxide.

The hydrogen-carbon monoxide gas mixture used in the process of this invention need not be pretreated to remove hydrogen sulfide or water. Hydrogen sulfide can be removed by conventional means from the hydrogen stream produced. The hydrogen produced by the process of this invention can be dried by conventional methods as, for example, by compressing and cooling, by treatment with liquid desiccants such as diethylene glycol in admixture with trimethylamine, triethylamine, tripropylamine, etc. Advantageously, when a mixture of secondary and tertiary amine is employed their boiling points should be closely related such as diisopropylamine and triethylamine, di-n-butylamine and tri-n-propylamine, diisoamylamine and triisobutylamine, etc. But since COS boils (and, hence, condenses) at much lower temperatures than the secondary amines or tertiary amines, the closeness of boiling points of secondary and tertiary amines is not critical. Secondary amines such as methylcyclohexylamine, dicyclohexylamine, ethylphenylamine, dibenzyl-amine, diphenylamine, among other secondary amines not strictly di "alkyl" amines can be used but to no particular advantage. In fact, for this hydrogen recovery process, the use of such secondary amines as dialkylamines containing 1 to 20 carbon atoms in each of their alkyl hydrocarbon groups do provide definite advantages, for their corresponding amine monothiolcarbamates are liquid products. Of these secondary amines, di-n-btuylamine is preferred, for its liquid amine monothiolcarbamate product. As will be hereinafter demonstrated, COS can be readily recovered from the liquid amine monothiolcarbamate product.

For a clearer understanding of the process of this invention, the following illustrative examples are given.

Example 1

A 300 ml. stainless steel reactor is charged with 100 g. (0.75 mole) di-n-butylamine, 10.7 g. (0.33 mole) sulfur and 2000 p.s.i.g. $CO/H_2$ (58/42%) and heated to 200° F. After two hours, the temperature is maintained at 200° F. and gas samples taken at various pressures and analyzed. The amount of COS in vent gas is measured by an Orsat apparatus. It is assumed that the absorption of gas in di-n-butylamine is due to COS, however, the amine also would pick up $H_2S$ and $CO_2$.

| Cut | Pressure, p.s.i.g. | Percent COS |
|---|---|---|
| 1 | 1,725-1,700 | 0.0 |
| 2 | 1,625-1,600 | 1.1 |
| 3 | 1,225-1,200 | 2.8 |
| 4 | 925-900 | 5.1 |
| 5 | 625-600 | 10.3 |
| 6 | 300-200 | 9.5 |
| 7 | 200-180 | 12.2 |

The gas removed by depressurizing to 1700 p.s.i.g. is substantially only hydrogen.

The reactor is next connected to a Dry Ice-acetone trap and heated to 240° F. and 16 g. (80% of theory) of COS is recovered. This COS plus that in the gas vented from below 1700 to 180 p.s.i.g. accounts for substantially all of the COS produced.

Example 2

Another process is carried out similar to Example 1 except reaction temperature is 140° F. After one hour at reaction temperature (final pressure was 1500 p.s.i.), gas samples are taken at various pressures and analyzed by Orsat method using di-n-butylamine and by mass spectroscopy from which the following analyses were obtained:

| Cut | Pressure, p.s.i.g. | Percent COS Orsat | Percent COS mass spectroscopy |
|---|---|---|---|
| 1 | 1,400-1,350 | 0.8 | 0.0 |
| 2 | 1,000-975 | 0.0 | 0.0 |
| 3 | 600-575 | 0.0 | 0.0 |
| 4 | 275-250 | 0.2 | 0.2 |

These analyses show good agreement between Orsat and mass spectroscopic analytical methods and demonstrate that nearly all of COS is retained in the amine solvent at this temperature (1 g. of liquid condensed from vent gases in Dry Ice-acetone trap). The gas vented from 1500 to 250 p.s.i.g. at 140° F. is substantially all hydrogen. The reaction solution is transferred at atmospheric pressure to a round-bottom flask connected to reflux condenser fitted with outlet to Dry Ice-acetone trap. The flask is heated and at about 85° C. gas evolution is noted. Upon further heating to 120° C., about 90% of COS comes over at 100-110° C. with 15.8 g. of COS collected at 100-120° C. Substantially all of the COS produced from carbon monoxide is recovered.

Example 3

In this example the reaction is conducted with excess sulfur to see how completely CO can be removed from a mixture containing 58% CO and 42% $H_2$. A 300 ml. stainless steel reactor is charged with 20.8 g. sulfur, 100 g. di-n-butylamine and 1500 p.s.i. $CO/H_2$ (58/42%) mixture. Reaction is maintained at 138–150° F. for 1½ hours. Final pressure at 138° F. is 825 p.s.i. (room temperature, 625 p.s.i.g.). Mass spectroscopic analysis of vent gas shows:

| Gas: | Percent |
| --- | --- |
| $H_2$ | 86.2 |
| CO | 12.5 |
| $CO_2$ | 1.0 |
| COS | 0.3 |

About 91% of CO is consumed when operating at 1500 p.s.i. $CO/H_2$ and 140° F. There is still considerable amount of sulfur left.

Example 4

The rate of uptake of CO from $CO/H_2$ mixture is determined. A 300 ml. stainless steel reactor is charged with 100 g. di-n-butylamine and 16 g. sulfur, heated to 150° F. and then charged with 200 p.s.i.g. $CO/H_2$ ($H_2$, 42.0%; CO, 57.7%; $CO_2$, 0.3%). A final pressure of 90 p.s.i.g. is reached in about 60 minutes in substantially a straight line relationship of pressure v. time. Mass spectroscopic analysis of the vent gas shows:

| Gas: | Percent |
| --- | --- |
| $H_2$ | 93.6 |
| CO | 6.2 |
| $CO_2$ | 0.1 |
| COS | 0.1 |

This demonstrates that about 95% of the CO is consumed producing hydrogen of 93.6% purity.

Example 5

The process of Example 4 is repeated with 200 p.s.i. of the same $CO/H_2$ mixture but at 160° F. and rate of CO uptake is again followed. The pressure dropped to about 95 p.s.i.g. in 60 minutes. The following vent gas analysis by mass spectroscopy is obtained:

| Gas: | Percent |
| --- | --- |
| $H_2$ | 92.8 |
| CO | 6.3 |
| $CO_2$ | 0.5 |
| COS | 0.4 |

Again, high purity hydrogen is produced.

Example 6

Rate of CO uptake is again followed by repeating Example 4, charging the reactor with 500 p.s.i. $CO/H_2$ and heating to 150° F. From a plot of pressure versus reaction time it is found that the reaction rate is much faster at higher pressures. Even after the partial pressure of CO reaches the level of Examples 4 and 5, the rate of reaction is faster. This suggests that the monothiolcarbamate has a positive effect on the rate. Analysis of the vent gases at the end of the run shows:

| Gas: | Percent |
| --- | --- |
| $H_2$ | 93 |
| CO | 5.8 |
| $CO_2$ | 0.6 |
| COS | 0.6 |

This demonstrates that 95% of CO is consumed and hydrogen of 93% purity is produced.

Example 7

Two 300 ml. stainless steel reactors are charged with 100 g. di-n-butylamine and 16 g. sulfur, and heated to 160° F. Three consecutive rate process studies are made in each reactor. Reactor I is charged sequentially with 100 p.s.i. CO, 350 p.s.i. CO and 100 p.s.i. CO in that order. Reactor II is charged with 350 p.s.i. CO first, then 100 p.s.i. CO and 100 p.s.i. CO. From a plot of the pressure drop with time it is found that the rate of reaction increases with the formation of the monothiolcarbamate and then levels off in this case at about 0 p.s.i.g., the final pressure in all six reactions. Because all the reaction goes to 0 p.s.i.g., the amine must be holding all the formed COS as the di-n-butylamine salt of N-dibutylmonothiolcarbamic acid.

The process of this invention illustrated in Examples 1 through 7 has the following advantages. The secondary amine is an excellent solvent for sulfur, particularly under the reaction temperature conditions. When the secondary amine is employed as a solvent alone or together with a tertiary amine, reaction temperatures below those employed when other solvents such as methanol are employed. Also, the conversion of carbon monoxide and sulfur to carbonyl sulfide is substantially quantitative. In addition, carbonyl sulfide is absorbed substantially as rapidly as it is produced. This is a great advantage over previously used solvents where carbonyl sulfide is produced and vented from the reaction site with other gaseous materials. It will be appreciated that because carbonyl sulfide is absorbed substantially as rapidly as it is produced, the overall reaction pressure is lower, but even more important, it is possible to operate at lower pressures than heretofore possible with other solvents. For example, when solvents other than secondary amines or mixtures of secondary and tertiary amines are employed, the reaction pressures at reaction temperatures of from 50–150° C. are in the range of 200–400 p.s.i.g. due to the high vapor pressure of carbonyl sulfide. When the amine solvents are employed, reaction pressures as low as 0 p.s.i.g. and no higher than about 150 p.s.i.g. (as is indicated by the final pressure in the illustrative batch processes) under the preferred conditions are obtained because there is substantially no carbonyl sulfide present to add its vapor pressure to the carbon monoxide and/or hydrogen. Furthermore, the process of this invention as hereinbefore illustrated eliminates the requirement for recovering carbonyl sulfide from vent gases in admixture with hydrogen, carbon monoxide, and the like as by scrubbing or condensing carbonyl sulfide with liquid air, nitrogen or some other extremely low-temperature refrigerant to fractionally condense carbonyl sulfide from the vent gases.

For a continuous process a mixture of carbon monoxide and hydrogen and an amount of secondary amine such as dibutyl, diamyl, dihexyl, dioctyl amine or of a mixture of secondary and tertiary amine are charged to a reaction zone containing sulfur at 50 to 150° C. The mole ratio of total amine to $H_2$/CO gas is in the range of 2.0 to 2.2 moles amine per mole of CO. Sulfur is added to the reaction zone to maintain an excess over the amount of CO charged. Sulfur addition can be conveniently made by adding sulfur to the amine and preheating the amine to reaction temperature and pressure. A pressure in the range of 0 to 150 p.s.i.g. is maintained in the reaction zone by venting unreacted gas through a pressure reducer when pressures above atmospheric are employed. The liquid reaction mixture amine monothiolcarbamate is withdrawn and maintained at at least its thermal decomposition temperature up to 250° F. In any case it is preferred to thermally decompose the amine monothiolcarbamate in the liquid phase, i.e. maintain the amine product of decomposition as a liquid. The carbonyl sulfide liberated is collected as a liquid either by cooling or by compressing and cooling.

The unreacted gas if the carbon monoxide content is higher than desired, is charged to a second reaction zone with sulfur and secondary amine or a mixture of secondary and tertiary amine under the same reaction conditions as hereinbefore set forth to remove substantially all of the carbon monoxide.

Two reaction zones in series with each zone having its own feed of amine and sulfur and with the source of carbon monoxide and hydrogen being fed to the first zone and gases vented from the first zone charged as gas feed to the second reaction zone should provide an unreacted gas from the second zone of high purity hydrogen substantially free of carbon monoxide. The liquid amine monothiolcarbamates from each reaction zone can be combined and decomposed to obtain a carbonyl sulfide stream and a liquid amine recycle stream.

To illustrate the utilization of other amines the following examples are given.

Example 8

A mixture of hydrogen and carbon monoxide (20% CO) is charged into the bottom of a packed tower into the top of which is charged a solution of sulfur in di-hexylamine at 50° C. The mole ratio of di-hexylamine to carbon monoxide is 2 to 1 and the mole ratio of sulfur to carbon monoxide is 1.05 to 1. The tower pressure is maintained at about 45 p.s.i.g. The gas retention time is up to about 30 minutes. The gases leaving the packed tower pass through a liquid gas separator. The liquid is returned to the tower and the gas is vented through a pressure reducer. Liquid is withdrawn from the bottom of tower through a pressure reducer and heated to 100° C. at atmospheric pressure in a vessel fitted with a condenser to recover COS as a liquid condensate. Liquid amine is pumped from the monothiolcarbamate decomposition vessel to a sulfur dissolving tank from which it is charged with cooling to 50° C. to the top of the packed tower. By this process 95% and above of the carbon monoxide may be converted to carbonyl sulfide and high purity hydrogen gas, 93–95% or higher hydrogen, may be recovered from the top of the gas-liquid disengaging zone.

Example 9

The process of Example 8 is repeated except that di-hexylamine is replaced with an equimolecular mixture of di-n-butylamine and tri-n-butylamine. By this process 95% and above of the CO may be converted to COS and high purity hydrogen, 93 to 95% and above may be obtained.

The use of methylaniline in the process of this invention for most efficient operation requires that the process be carried out at pressures above atmospheric, e.g. 20 to 300 p.s.i.g., at temperatures in the range of 50 to 150° C. for the retention of the COS formed as the methylaniline salt of the corresponding N-methyl-N-phenyl monothiolcarbamic acid is too low at atmospheric pressure. The use of diethanolamine at 30° C. and atmospheric pressure in the process of this invention also results in the contamination of the hydrogen stream withdrawn with COS. The retention of COS as the diethanolamine salt of N-bis(beta-hydroxyethyl) monothiolcarbamic acid improves somewhat at 50° C. and atmospheric pressure and at pressures of 20 to 100 p.s.i. and temperatures of 50 to 100° C. the retention of COS in the reaction mixture is suitable. Dicyclohexylamine absorbs the COS formed in situ at atmospheric pressure and 25 to 30° C. as do piperidine and morpholine, however, at these temperatures the corresponding amine monothiolcarbamates are solids and their successful use in the process of this invention requires the use of either a solvent such as an alcohol, ketone, water, liquid hydrocarbon, dibutylether, dimethylformate, tetrahydrofuran, dimethyl sulfoxide and chlorobenzene, among others or the use of equimolar portions of a tertiary amine of another secondary amine which will maintain the amine monothiolcarbamate as a liquid.

Suitable mixtures of secondary and tertiary amines include, among others, mixtures of di- and tributylamine; di- and triamylamines; di- and trihexylamines; di- and trioctylamines; dibutylamine and triethylamine; dipropylamine and pyridine; dibutylamine and dimethylaniline; diethylamine and pyridine; morpholine and tributylamine, triethylamine, tripropylamine or trimethylamine; methylaniline and dimethylaniline; methylaniline and trimethylamine, triethylamine, tripropylamines or tributylamines; dihexylamines and tributylamines; and dicyclohexylamine and trimethylamine, triethylamine, tripropylamines and tributylamines. Such mixtures may be suitably employed at 20 to 80° C. and from atmospheric pressure up to about 45 p.s.i.g. Again, where the amine monothiolcarbamate is a solid at 20 to 80° C. a solvent such as those mentioned hereinbefore may be used to maintain a liquid reaction product. The mixed amine monothiolcarbamate product in general liberates COS at 100 to 200° C. and atmospheric pressure at commercially feasible rates.

The following example will suffice for the illustration of the use of mixtures of secondary and tertiary amines.

Example 10

A 150 milliliter gas absorption vessel is charged with 0.3 mole (55 grams) of tributylamine and 0.284 mole (36.7 grams) of di-n-butylamine containing 0.5 mole (16 grams) sulfur at 50° C. The pressure reducing valve for the venting gases is set at 30 p.s.i.g. A mixture of 60% carbon monoxide and 40% hydrogen is introduced into the amine-sulfur reaction mixture until about 0.26 mole of carbon monoxide is introduced. The liquid reaction mixture which forms liberates quantitatively the COS formed in situ and retained as the tributylamine salt of N-(di-n-butyl) monothiolcarbamic acid at 75 to 125° C. and atmospheric pressure. By this process there may be obtained at the vent gas during reaction a hydrogen stream of 90 to 95% and above purity.

The process of this invention is suitable for removal of carbon monoxide as low as 1% from a hydrogen-containing gas or as much as 99% CO and 1.0% $H_2$. The process of this invention can be employed to remove carbon monoxide from gases vented from an oxo process to provide hydrogen of sufficient purity for the reduction of the oxogenation aldehyde product. Also, the process of this invention is useful for carbon monoxide removal from mixtures of carbon monoxide and hydrogen available from steel mills and petroleum refineries in addition to carbon monoxide from the oxidation of hydrocarbons with oxygen or water and from water gas reactions.

What is claimed is:

1. A method of recovery of hydrogen from mixtures of hydrogen and carbon monoxide which comprises reacting at a temperature in the range of 50° to 150° C., and at a pressure in the range of 1.0 to 200 atmospheres, said mixture containing hydrogen and carbon monoxide in a reaction zone with sulfur and a liquid phase of an initial secondary amine in an amount to provide at least one mole of the secondary amine per mole of carbon monoxide to thereby form the monothiolcarbamic acid of said secondary amine, said reaction being also in the additional presence of at least one mole of secondary amine, tertiary amine, or a mixture of secondary and tertiary amines, to thereby form the amine salt, corresponding with said additional amine or amines, of said monothiolcarbamic acid of the initial secondary amine, maintaining a pressure to retain in that salt all of the carbonyl sulfide formed in situ, and withdrawing the unreacted gas from said reaction zone whereby hydrogen of at least 90 mole percent purity is obtained.

2. A method of recovery of hydrogen from mixtures of hydrogen and carbon monoxide which comprises reacting, at a temperature in the range of 50° to 150° C. and under pressure in the range of 1.0 to 300 atmospheres, said mixture of hydrogen and carbon monoxide with sulfur dissolved in a liquid phase of a dialkylamine whose alkyl groups contain 1 to 20 carbon atoms and in an amount of sulfur and the dialkylamine to provide one mole sulfur and two moles of that secondary amine per mole of carbon monoxide thereby forming a liquid phase of the dialkylamine salt of the N-dialkyl monothiolcarbamic acid of the dialkylamine reactant, maintaining a pressure to retain in the liquid phase of the salt all the carbonyl sulfide formed in situ, withdrawing the unreacted gas mixture from said reaction zone and recycling it to said reaction zone until the CO is consumed, and thereafter withdrawing substantially carbon monoxide free hydrogen.

3. A method of recovery of hydrogen from mixtures of hydrogen and carbon monoxide which comprises reacting said mixture containing hydrogen and carbon monoxide in a reaction zone with sulfur dissolved in dibutylamine wherein the solution contains for each mole of carbon monoxide at least one mole of sulfur and two moles of dibutylamine per mole of carbon monoxide to form a liquid phase of dibutylamine salt of N-dibutyl-monothiolcarbamic acid at a temperature in the range of from 50 to 120° C. and at a pressure to maintain a liquid phase of said salt and retain all carbonyl sulfide formed in situ in said salt, withdrawing the unreacted gas mixture from said reaction zone as hydrogen of about 90% purity, withdrawing said liquid phase of the amine monothiolcarbamate from the reaction zone, heating the withdrawn amine monothiolcarbamate to a temperature in the range of 90 to 120° C., collecting carbonyl sulfide liberated at 90 to 120° C., and recycling to the reaction zone the amine mixture residue remaining after carbonyl sulfide liberation.

4. The process of claim 3 wherein the hydrogen gas removed from the reaction zone is charged to a second reaction zone containing dibutylamine solution of sulfur at 50 to 120° C. in the ratio of one mole of sulfur and two moles of dibutylamine per mole of carbon monoxide and withdrawing substantially pure hydrogen from said second reaction zone.

5. The process of claim 3 wherein the hydrogen gas removed is scrubbed with ammonical cuprous salt solution and dried to obtain substantially carbon monoxide free hydrogen.

References Cited

UNITED STATES PATENTS

| 1,685,733 | 9/1928 | Uhde | 23—2 |
| 2,311,342 | 2/1943 | Kerns et al. | 23—2 X |
| 2,486,778 | 11/1949 | Doumani | 23—2 |
| 2,524,088 | 10/1950 | Shaw | 23—2 |
| 2,758,005 | 8/1956 | Oakley | 23—203 |
| 2,992,896 | 7/1961 | Applegath et al. | 23—203 |
| 3,125,417 | 3/1964 | Franz et al. | 23—203 |

FOREIGN PATENTS

| 341,584 | 1/1931 | Great Britain. |

OSCAR R. VERTIZ, *Primary Examiner.*

B. H. LEVENSON, *Assistant Examiner.*